United States Patent [19]

Kitaya et al.

[11] Patent Number: 4,685,180
[45] Date of Patent: Aug. 11, 1987

[54] CONTOUR SHAPING APPARATUS

[75] Inventors: Katsuhiko Kitaya, Meguro; Naohiro Iida, Hachioji; Atsushi Miyake, Kawasaki; Mitsuo Kobayashi, Shiga; Akira Shirai, Higashiosaka, all of Japan

[73] Assignee: Nippon Sheet Glass Co., Ltd., Osaka, Japan

[21] Appl. No.: 755,773

[22] Filed: Jul. 16, 1985

[30] Foreign Application Priority Data

Jul. 19, 1984 [JP] Japan .................. 59-150172

[51] Int. Cl.$^4$ ................................. B24B 7/00
[52] U.S. Cl. ...................... 29/33 R; 51/5 C
[58] Field of Search .......... 51/5 C, 35, 165.71, 51/165.77, 283 E; 83/565, 879–881, 886; 225/96, 96.5; 29/33 R, 565

[56] References Cited

U.S. PATENT DOCUMENTS

| | | | |
|---|---|---|---|
| 3,520,456 | 7/1970 | Augustin et al. | 225/96.5 X |
| 3,538,967 | 11/1970 | Hensley | 51/35 X |
| 3,827,189 | 8/1974 | Highberg et al. | 51/283 E X |
| 3,913,272 | 10/1975 | Johnson et al. | 51/5 C |
| 3,942,287 | 3/1976 | Tokunaga et al. | 51/35 X |
| 4,228,617 | 10/1980 | Bando | 51/283 E X |

FOREIGN PATENT DOCUMENTS 2101920 1/1983 United Kingdom .............. 83/886

Primary Examiner—Robert L. Spruill
Assistant Examiner—Steven P. Weihrouch
Attorney, Agent, or Firm—Jones, Day, Reavis & Pogue

[57] ABSTRACT

A cutting unit and a grinding unit are aligned adjacently and adopt a common contour tracing means numerically controlled with respect to a X-Y plane coordinate system. A cutting tool and a grinding tool are provided on respective θ-axes along Z-direction and are commonly controlled about the θ-axes to direct in a tangential or a normal direction of the contour. The cutting and grinding tools are shiftable away from a reference point of the θ-axis to finely adjust a cutting line and a grinding edge outward/inward a reference contour.

25 Claims, 16 Drawing Figures

CONTOUR SHAPING APPARATUS

BACKGROUND OF THE INVENTION

1. Field of the Invention

The present invention relates to a contour shaping apparatus which cuts a plate material such as a glass plate into a predetermined shape and grinds its edge (chamfering).

2. Description of the Prior Art

A conventional cutting/grinding apparatus of this type automatically forms a predetermined shape by a profiling machine or by a numerically controlled machine. Since cutting and grinding operations require different conditions, i.e., machining tools, machining positions, machining margins, pressing directions of tools and the like, conventionally, cutting and grinding machines are separately provided, and a special-purpose template and NC data must be prepared for each machine.

However, in a system for manufacturing a plurality of types of glass plates having different shapes and sizes, a template and NC data (pattern) must be replaced or updated for both the cutting and grinding machines every time the type of glass plate is changed, resulting in inconvenience. When contour trace precision between cutting and grinding operations is mismatched, machining precision is degraded.

SUMMARY OF THE INVENTION

The present invention has been made in order to resolve the above problems, and has as its object to provide a contour shaping apparatus which performs cutting and grinding operations substantially by a single apparatus so as to improve a machining precision, and which improves an operation efficiency by quick response to a change in type of work, thereby achieving savings in labor and space.

According to the present invention, a contour shaping apparatus consists of a cutting unit for cutting a plate material in accordance with preset contour data, and a grinding unit for grinding a cut edge. The cutting and grinding units comprise a common contour tracing means which is numerically controlled with respect to a plane coordinate system. At least one of the cutting and grinding units comprises an angle controlling means for controlling an angle of a tool about an axis perpendicular to the plane coordinate system.

With the above arrangement, cutting and edge grinding operations can be performed in parallel by a single apparatus. The apparatus can be operated by common NC data. By utilizing the angle controlling means of the tool, the grinding operation can be performed along a line inside a direction of a normal to a cutting line in consideration of a grinding margin.

DETAILED DESCRIPTION OF THE PREFERRED EMBODIMENTS

Figure 1:
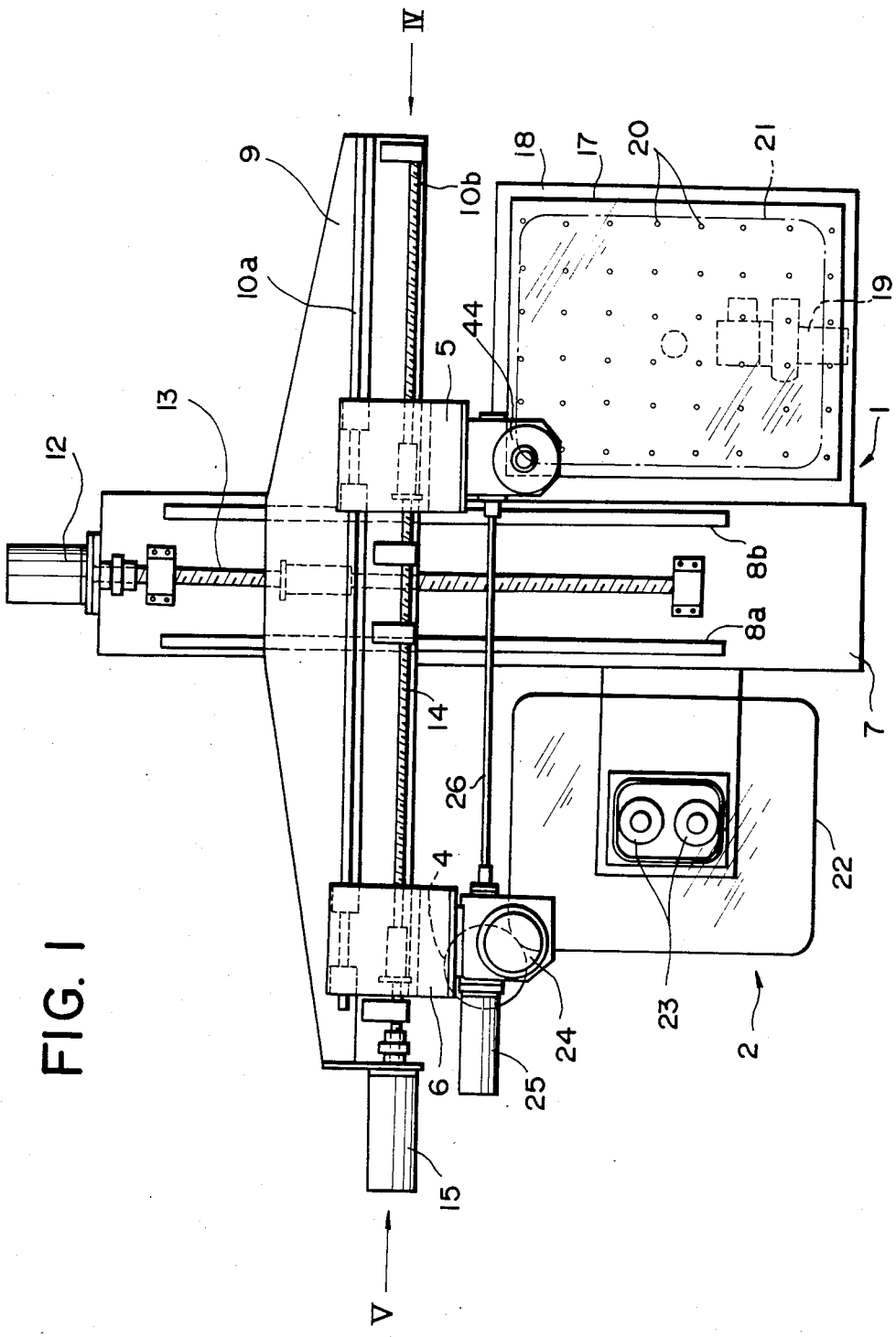
FIG. 1 is a plan view of a plate glass cutting/grinding apparatus according to an embodiment of the present invention.
Figure 2:
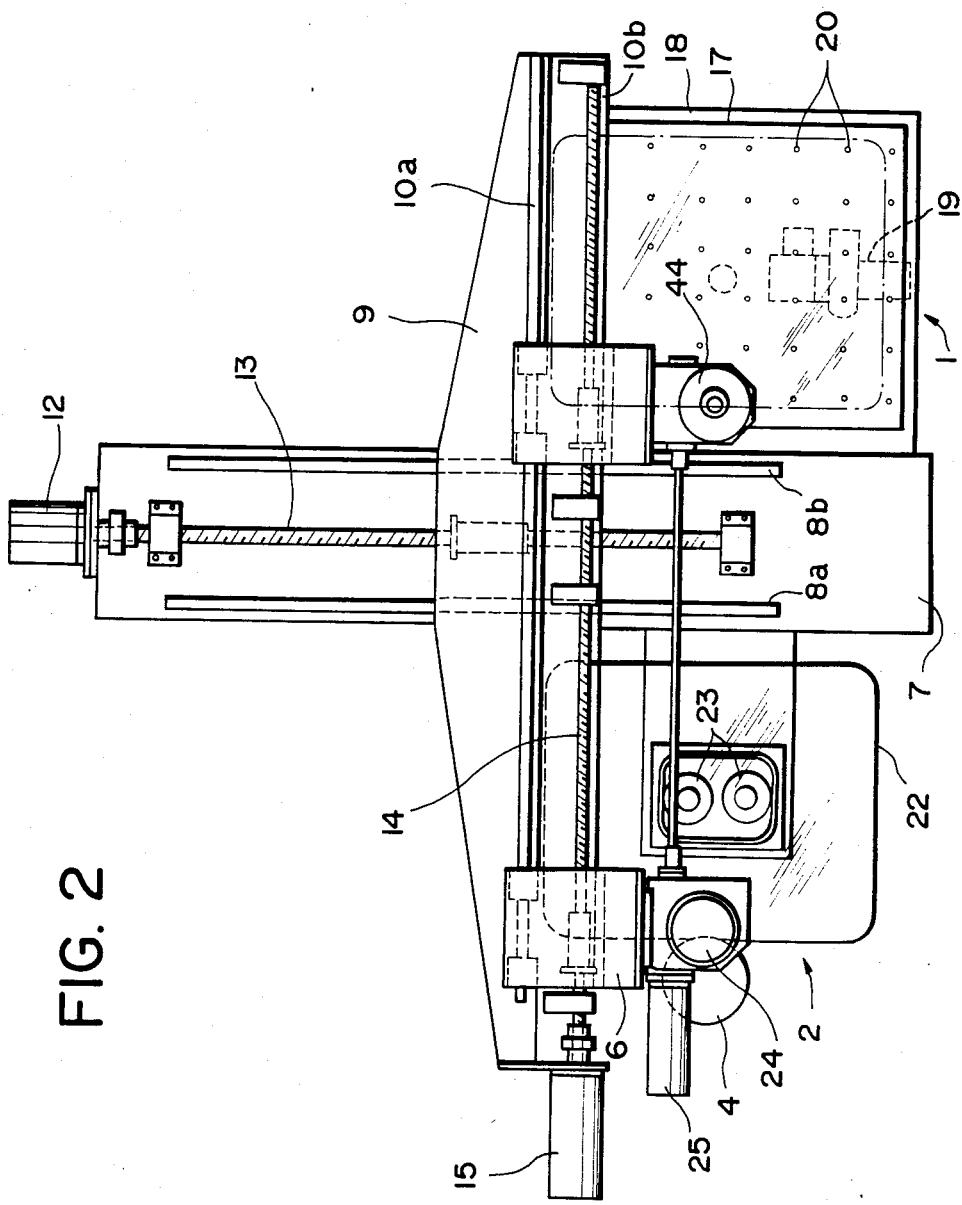
FIG. 2 is a plan view of an operation state of the apparatus shown in FIG. 1.
Figure 3:
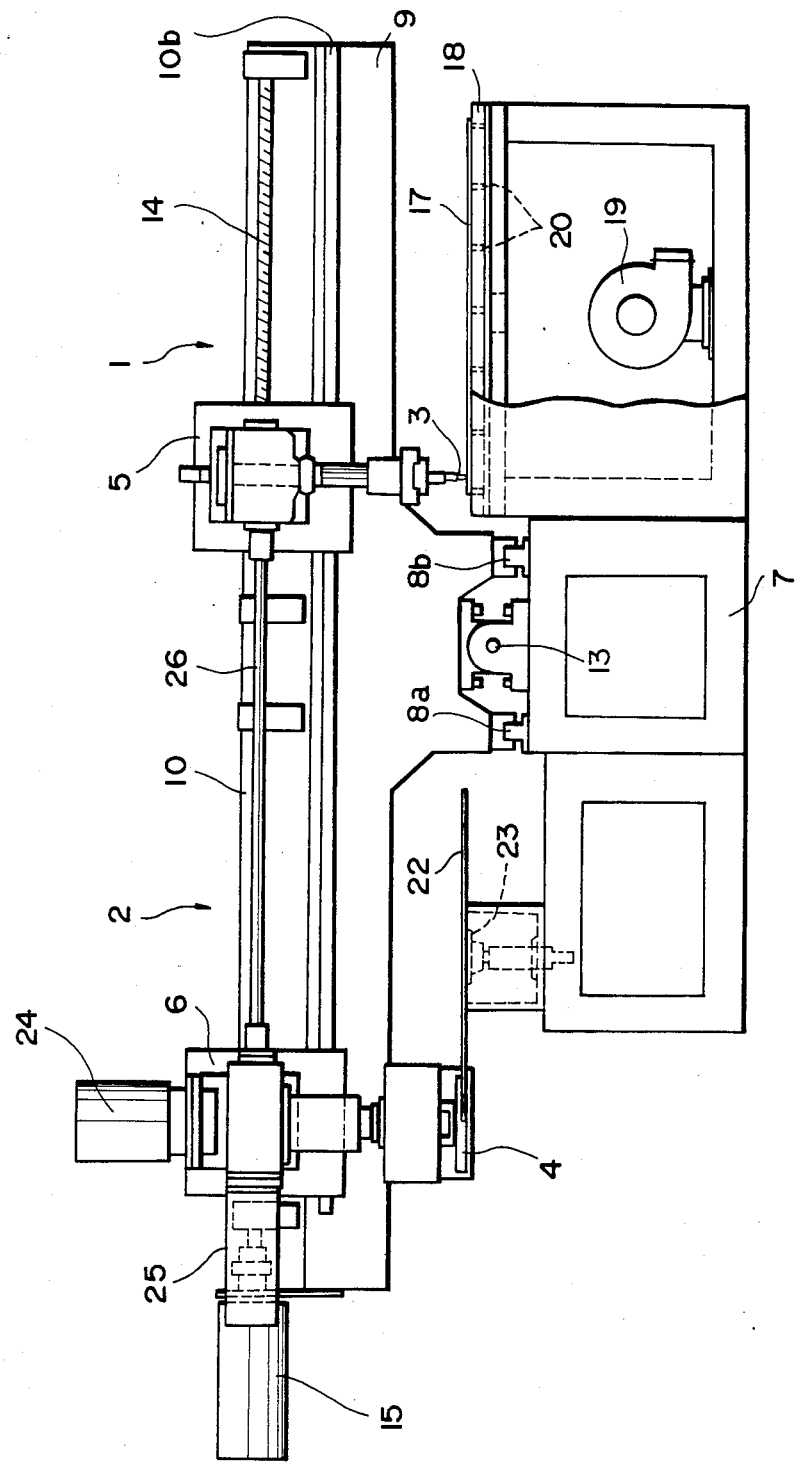
FIG. 3 is a front view of the apparatus shown in FIG. 1.
Figure 4:
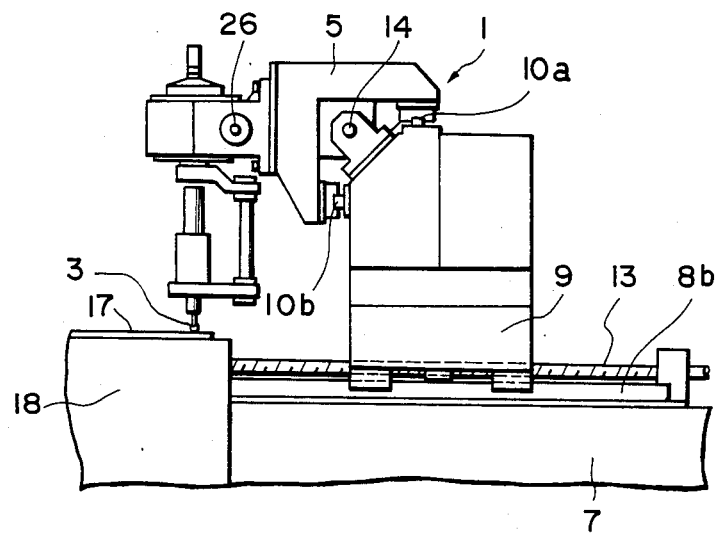
FIG. 4 is a side view of a cutting unit viewed in a direction indicated by arrow IV of FIG. 1.
Figure 5:
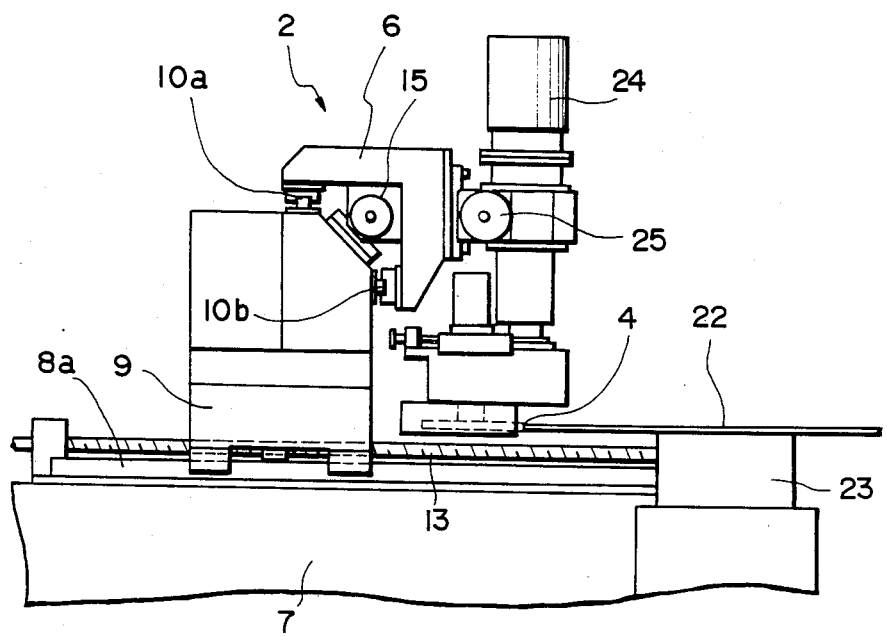
FIG. 5 is a side view of a grinding unit viewed in a direction indicated by arrow V in FIG. 1.

FIG. 1 is a plan view of a plate glass cutting/grinding apparatus according to an embodiment of the present invention, and FIG. 2 is a plan view of an operation state thereof. FIGS. 3 to 5 are respectively a front view and side views in directions indicated by arrows IV and V of FIG. 1.

As shown in FIGS. 1 to 5, the cutting/grinding apparatus comprises a cutting unit 1 (FIG. 4) at the right of FIG. 1 and an edge grinding unit 2 (FIG. 5) at the left of FIG. 1. The cutting unit 1 comprises a cutting wheel 3 for cutting, and the grinding unit 2 comprises a grinding wheel 4. The cutting and grinding wheels 3 and 4 are NC controlled with respect to an orthogonal coordinate system, thereby performing cutting of a glass plate having a predetermined outer shape from a plate material, and grinding an end face thereof (i.e., chamfering of an edge, plane grinding or U-shape grinding of an end face).

Carriages 5 and 6 of the cutting and grinding wheels 3 and 4 have the common X- and Y-axes of the orthogonal coordinate system. That is, guide rails 8a and 8b are provided on a base 7 along the Y direction, and a moving table 9 is slidably guided along the Y direction by the guide rails 8a and 8b. Guide rails 10a and 10b are provided on the moving table 9 along the X direction. The carriages 5 and 6 of the cutting and grinding units 1 and 2 are moved and guided by the guide rails 10a and 10b along the X direction.

The moving table 9 is driven along the Y direction by a Y-axis control motor 12 and a feed screw 13. The carriages 5 and 6 are driven along the X direction by a common feed screw 14 and an X-axis control motor 15. Therefore, the carriages 5 and 6 are position controlled by a single contour tracing means consisting of guide and driving means along the Y and X directions, and the cutting and grinding wheels 3 and 4 mounted on the carriages 5 and 6 are position controlled so as to form (or trace) an identical path, respectively.

A glass plate material 17 to be cut into a predetermined shape is fixed on an air table 18 of the cutting unit 1 by vacuum suction. A suction device 19 is provided below the air table 18. Air is drawn through a plurality of suction holes 20 formed in the air table 18 and the glass plate material 17 is drawn by suction. The cutting wheel 3 moves along a predetermined cutting line 21 upon application of a pressure perpendicular to the surface of the glass 17, thereby forming a cutting groove.

A glass plate 22 cut along the cutting groove is supported at a center of the lower surface thereof by suction pads 23 of the grinding unit 2. The grinding wheel 4 is urged against a side end face (edge) of the glass plate 22, and travels around the plate 22 while being rotated at high speed, thereby chamfering the edge.

The glass plate material 17 and the glass plate 22 which is cut to a predetermined outer shape are simultaneously set on the cutting and grinding units 1 and 2, and the cutting and the grinding operations are performed simultaneously.

The cutting wheel 3 of the cutting unit 1 is angularly controlled so that its cutting edge surface is directed in a direction normal to the cutting line 21, i.e., the cutting direction of the cutting wheel 3 is always directed along the tangential direction of the cutting line 21. The grinding wheel 4 of the grinding unit 2 is angularly controlled with respect to the Z-axis so that a pressing direction thereof is always directed in the direction normal to the side end face of the glass plate 22. A rotating angle $\theta$ of the cutting and grinding wheels 3 and 4 about the Z-axis is controlled by a common $\theta$-axis control motor 25, and $\theta$ shafts of the respective units are coupled by a single coupling shaft 26.

Figure 6:
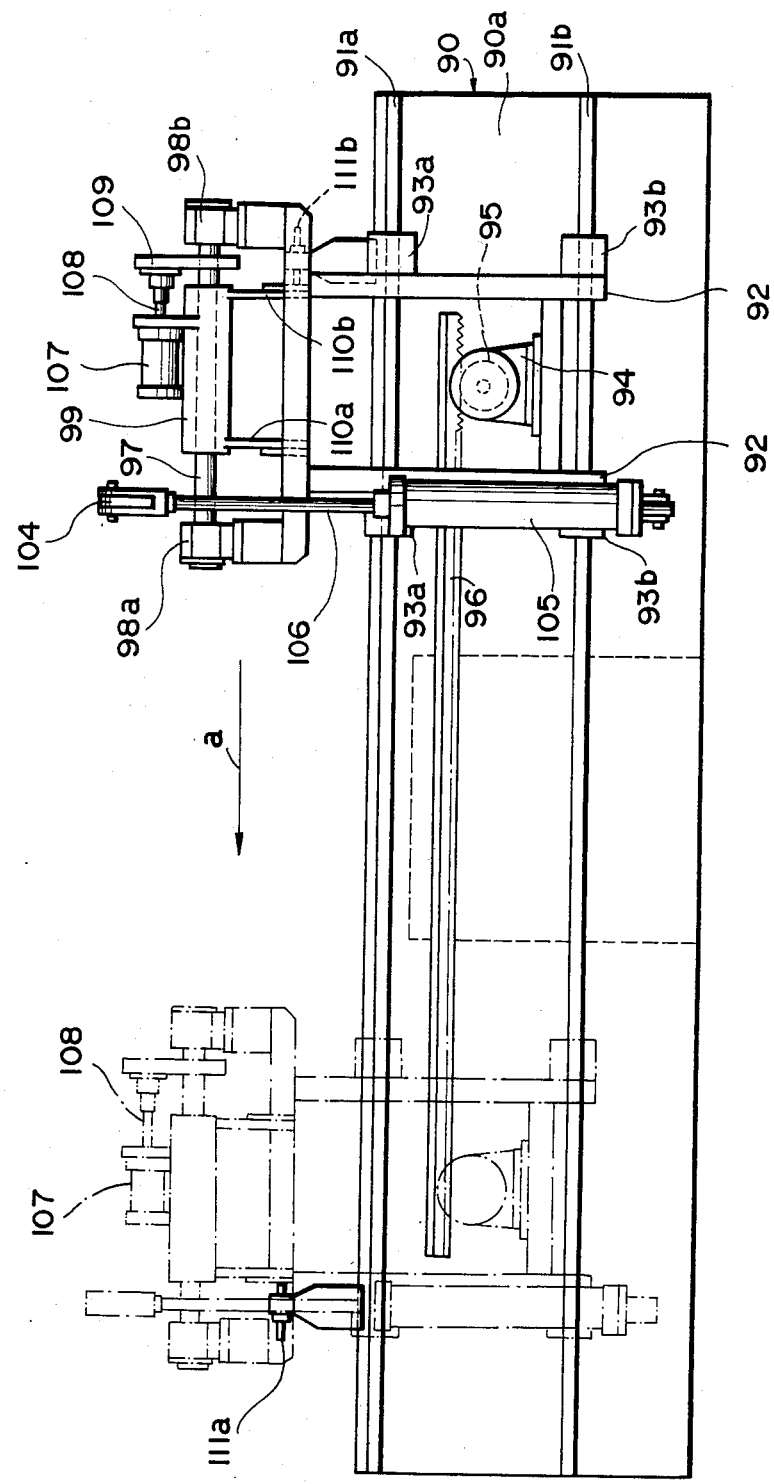
FIG. 6 is a front view of a unit for conveying a cut glass plate 22 from the cutting unit 1 to the grinding unit 2.
Figure 7:
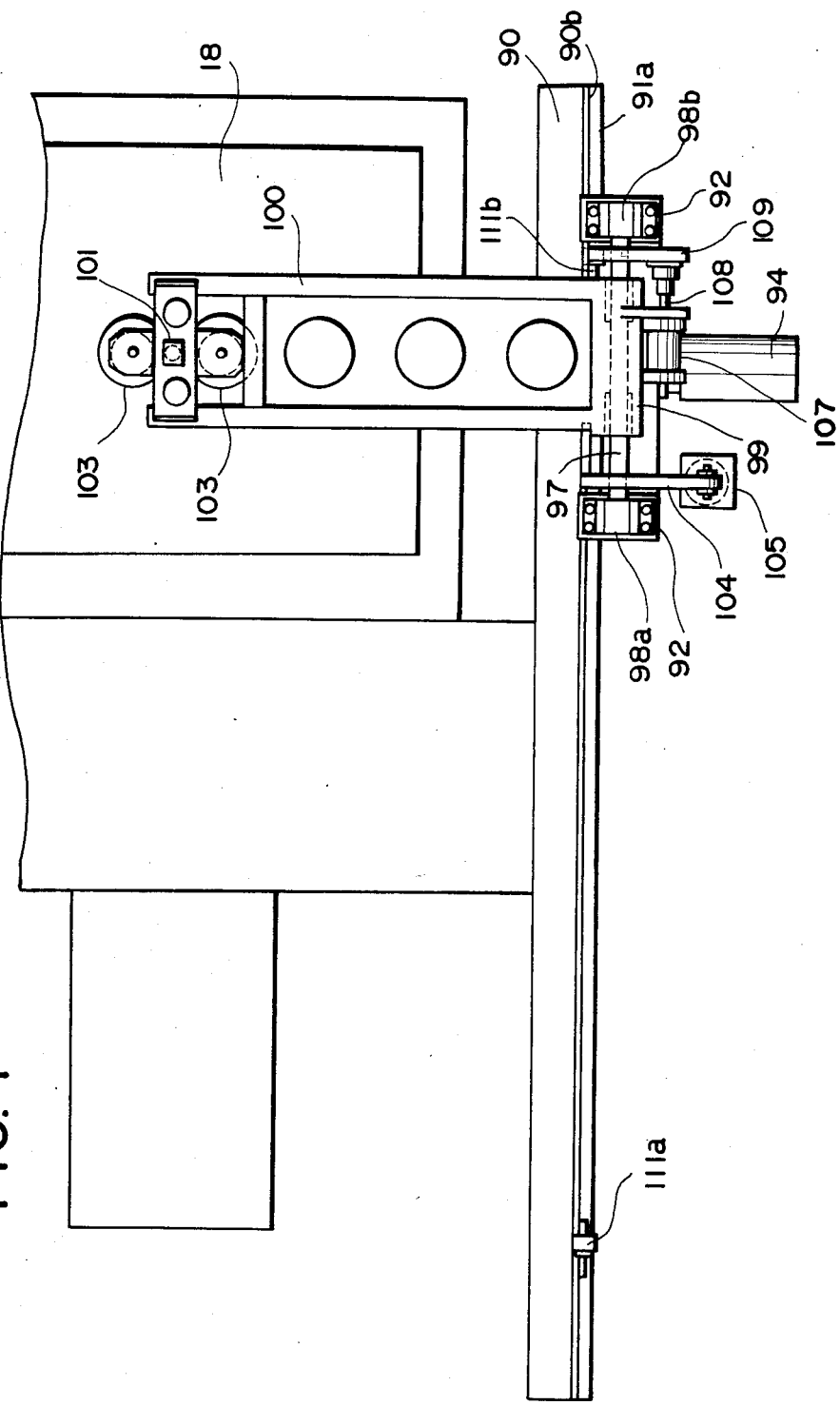
FIG. 7 is a plan view of FIG. 6.
Figure 8:
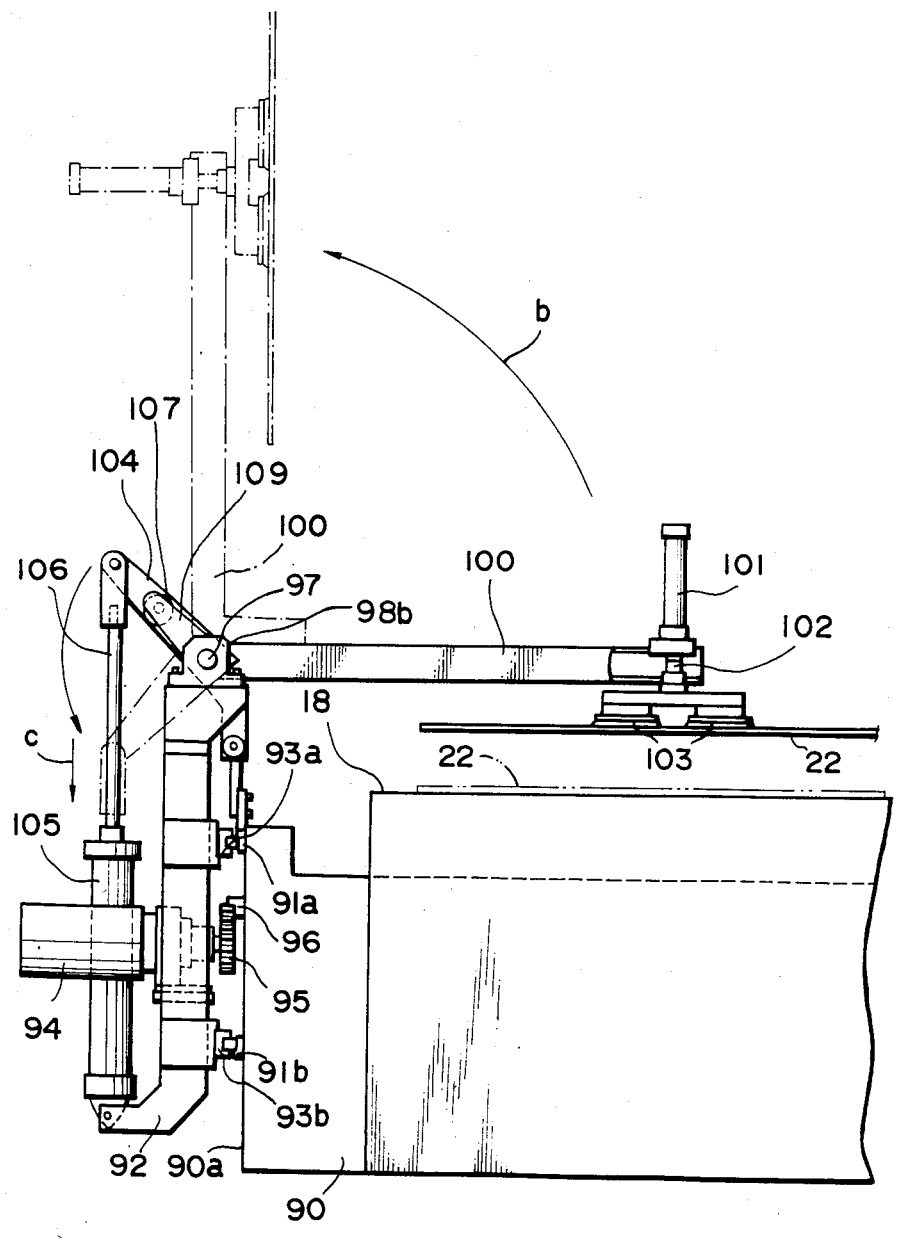
FIG. 8 is a side view of the unit in FIG. 6 viewed from the right therein.

FIG. 6 is a front view of a unit for conveying the cut glass plate 22 from the cutting unit 1 to the grinding unit 2, FIG. 7 is a plan view thereof, and FIG. 8 is a side view from the right of FIG. 6. The conveying unit has a track base 90 along the cutting and grinding units 1 and 2. A conveying frame 92 is arranged on parallel guide rails 91a and 91b provided on a vertical surface 90a through slide bearings 93a and 93b so as to be slidable along a direction indicated by arrow a. A rack 96 is arranged on the vertical surface 90a of the track base 90 along a conveying direction. When a pinion 95 meshed with the rack 96 is driven by a motor 94 mounted on the conveying frame 92, the conveying frame 92 operates.

A slide shaft 97 extending along the conveying direction is pivotally mounted on the upper portion of the conveying frame 92 so that the two ends thereof are supported by bearings 98a and 98b. An arm base 99 is guided and held by the slide shaft 97 to be slidable along the axial direction of the slide shaft 97. A pivotal arm 100 extends from the arm base 99 toward the cutting and grinding units 1 and 2. The pivotal arm 100 is slidable along the axial direction of the slide shaft 97, and is pivotal through about 90° (vertical to horizontal) in a plane perpendicular to a direction indicated by arrow b in FIG. 8 upon rotation of the slide shaft 97.

A cylinder 101 is mounted on a distal end portion of the pivotal arm 100, and a pair of suction pads 103 are provided at a distal end of a piston rod 102 of the cylinder 101. When the piston rod 102 is elongated so as to hold the glass plate 22 by suction, and the piston rod 102 is moved upward, the glass plate 22 can be lifted up from the air table 18 of the cutting unit 1, as shown in FIG. 8.

The pivotal arm 100 is pivoted to an upright position as indicated by an alternate dot-dashed line in FIG. 8, and in this state, the glass plate 22 is conveyed to the grinding unit 2 upon movement of the conveying frame 92. A pivotal movement of the pivotal arm 100 is performed by pulling a free end of a crank arm 104 by a piston rod 106 of a cylinder 105 in a direction indicated by arrow c.

The conveying frame 92 is stopped at a proper position facing the cutting and grinding units 1 and 2 under the control of the motor 94 in accordance with position detection using a limit switch or the like. In consideration of the inertia of the conveying frame 92 and a meshing margin of the pinion 95 and the rack 94, precise alignment of the conveyed glass plate is performed by fine movement of the arm base 99 slidably guided by the slide shaft 97.

A position of the arm base 99 is adjusted by extension/constriction of a piston rod 108 of a cylinder 107 fixed on the arm base 99. Since the distal end of the piston rod 108 is fixed to a reception plate 109 fixed at one end side of the slide shaft 97, the arm base 99 is slid along the axial direction of the slide shaft 97 due to extension/constriction of the piston rod 108.

When the conveying frame 92 is moved at the side of the grinding unit 2, as indicated by an alternate dot-dashed line in FIG. 6, the piston rod 108 of the cylinder 107 is extended. This extension is performed until a stop plate 110a arranged to be suspended from one side end portion of the arm base 99 abuts against a stopper 111a extending from the left end portion of the track base 90, thus achieving alignment of the glass plate 22 with respect to the grinding unit 2. After completing alignment of the glass plate 22, the pivotal arm 100 is returned to a horizontal state, and the piston rod 102 of the cylinder 101 is extended, thus conveying the glass plate 22 onto the suction pads 23 of the grinding unit 2.

Conversely to the above description, the pivotal arm 100 is aligned with respect to the cutting unit 2 by constricting the piston rod 108 of the cylinder 107 on the arm base 99. A stop plate 110b paired with the stop plate 110a is mounted on the lower portion of the arm base 99, and the piston rod 108 is constricted until the stop plate 110b abuts against a stopper 111b extending from the right end of the track base 90, thus achieving alignment of the pivotal arm 100 with respect to the cutting unit 1, as shown in FIG. 6.

As described above, since the cut glass plate 22 is conveyed to the grinding unit 2 and is precisely aligned, the cutting and grinding units 1 and 2 can use the common coordinate system, and machining paths of the cutting and grinding wheels 3 and 4 can be set to be the same, so that the cutting and grinding operations are executed simultaneously. Alignment points of the glass conveying pivotal arm 100 with respect to the cutting and grinding units 1 and 2 can be finely adjusted by adjusting the positions of the stoppers 111a and 111b extending from the left and right ends of the base 90.

Figure 9:
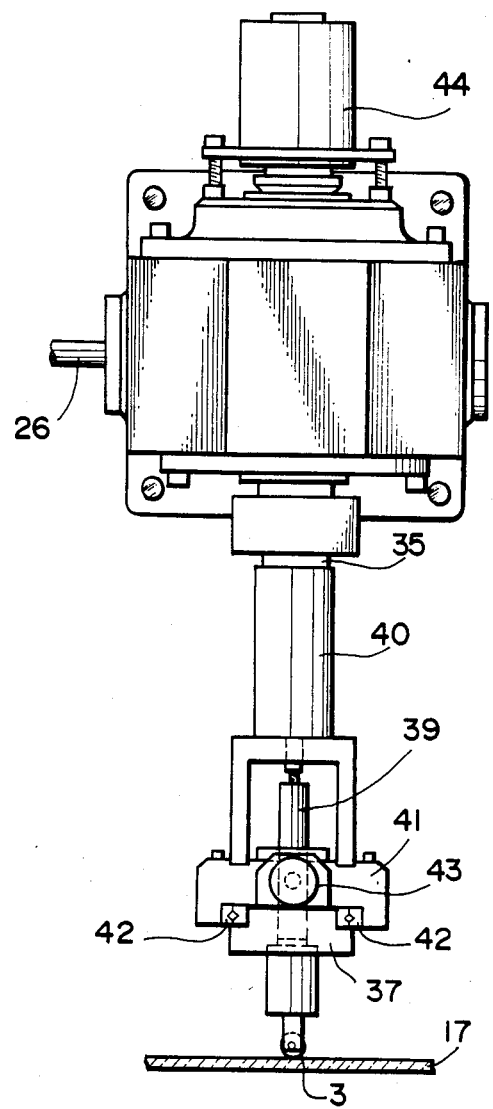
FIG. 9 is an enlarged front view of the cutting unit.
Figure 10:
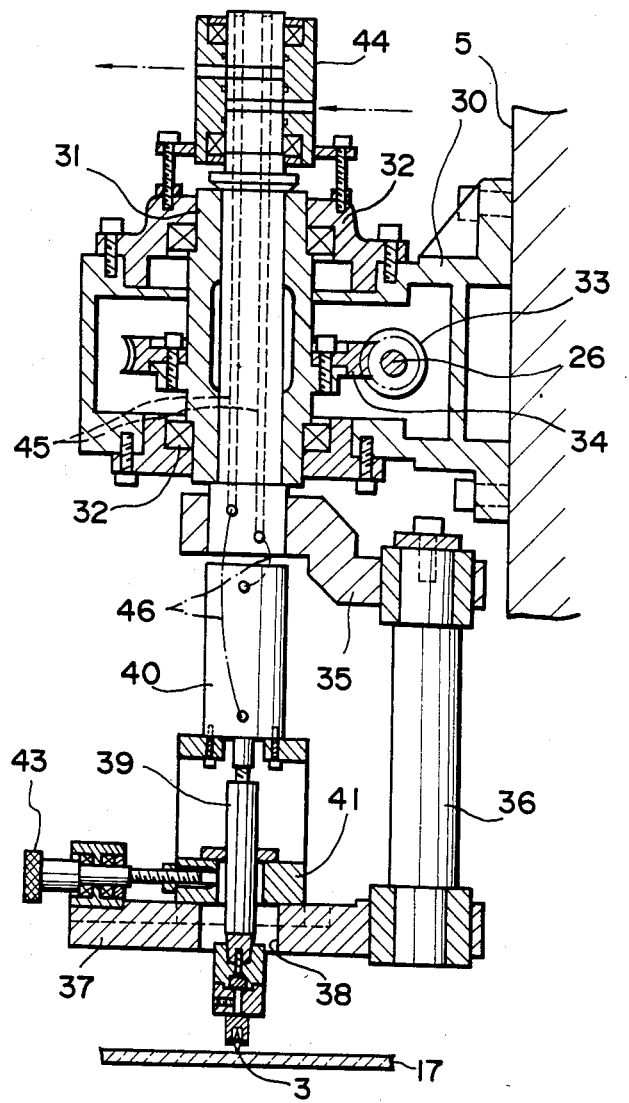
FIG. 10 is an enlarged longitudinal sectional view of the cutting unit.

FIG. 9 shows an enlarged front view of the cutting unit 1, and FIG. 10 is a cross sectional view of a side surface thereof. A supporting frame 30 is fixed on a front end face of the carriage of the cutting unit 1 so as to extend toward the front side, and a $\theta$ spindle 31 along the Z-axis is pivotally supported by the supporting frame 30 through a bearing 32. The $\theta$ spindle 31 is rotated through a worm 33 and a worm wheel 34 by the coupling shaft 26 coupled to the $\theta$-axis control motor 25. A cantilever bridge 37 is held by the lower end of the $\theta$ spindle 31 through a bracket 35 and a coupling rod 36. The cutting wheel 3 is supported to be vertically and horizontally movable with respect to the bridge 37. The overall supporting mechanism of the bridge 37 and the cutting wheel 3 is rotated about the Z-axis upon rotation of the $\theta$ spindle 31.

The cutting wheel 3 is fixed on the distal end of a piston rod 39 extending through a hole 38 of the bridge 37. The piston rod 39 is vertically movable by an air cylinder 40 along the Z-axis. When the glass plate material is cut, the piston rod 39 is extended, and a proper cutting pressure perpendicular to the glass surface is supplied to the cutting wheel 3. When the glass plate material 17 is set on the air table 18, the piston rod 39 is pulled up to its uppermost position.

An introduction/exhaust path of compressed air for driving the cylinder 40 is conducted to the lower end of the $\theta$ spindle 31 through a rotating joint 44 mounted on the upper end of the $\theta$ spindle 31 and a conducting pipe 45 provided in a center cylinder of the $\theta$ spindle 31, and is coupled to the cylinder 40 through a flexible tube 46.

The air cylinder 40 is horizontally movably mounted on a movable block 41 which is slidably guided on the bridge 37 through a slide bearing 42. An adjusting knob 43 is provided at a free end side of the bridge 37. A threaded portion 44 at the distal end side of the knob 43 is meshed with the movable block 41. Therefore, when the adjusting knob 43 is rotated, the movable block 41 can be moved in the horizontal direction. Thus, the Z-axis of the cutting wheel 3 is shifted from the axial center of the $\theta$ spindle 31 so as to finely adjust a cutting path.

When the cutting wheel 3 is moved forward in a direction toward the coupling rod 36 in FIG. 10 by rotating the adjusting knob 43, a cutting path is enlarged. The cutting path is reduced when the cutting wheel 3 is moved backward.

Figure 11:
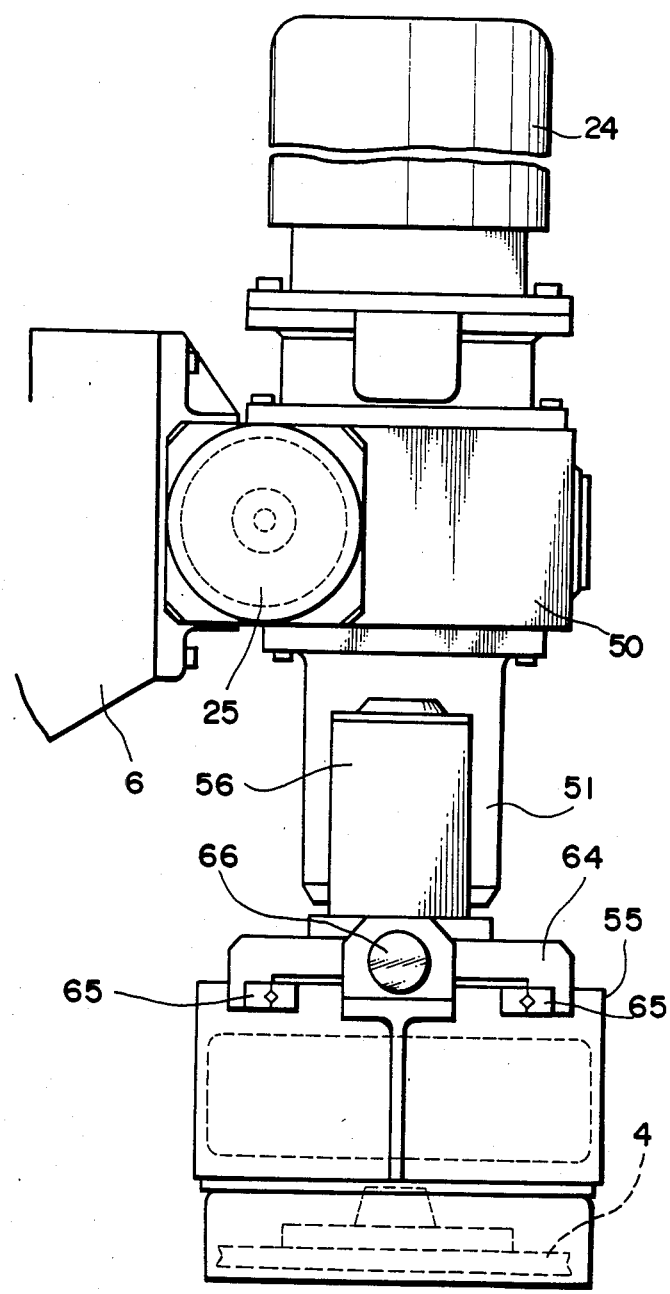
FIG. 11 is an enlarged front view of the grinding unit viewed in a direction indicated by arrow V in FIG. 1.
Figure 12:
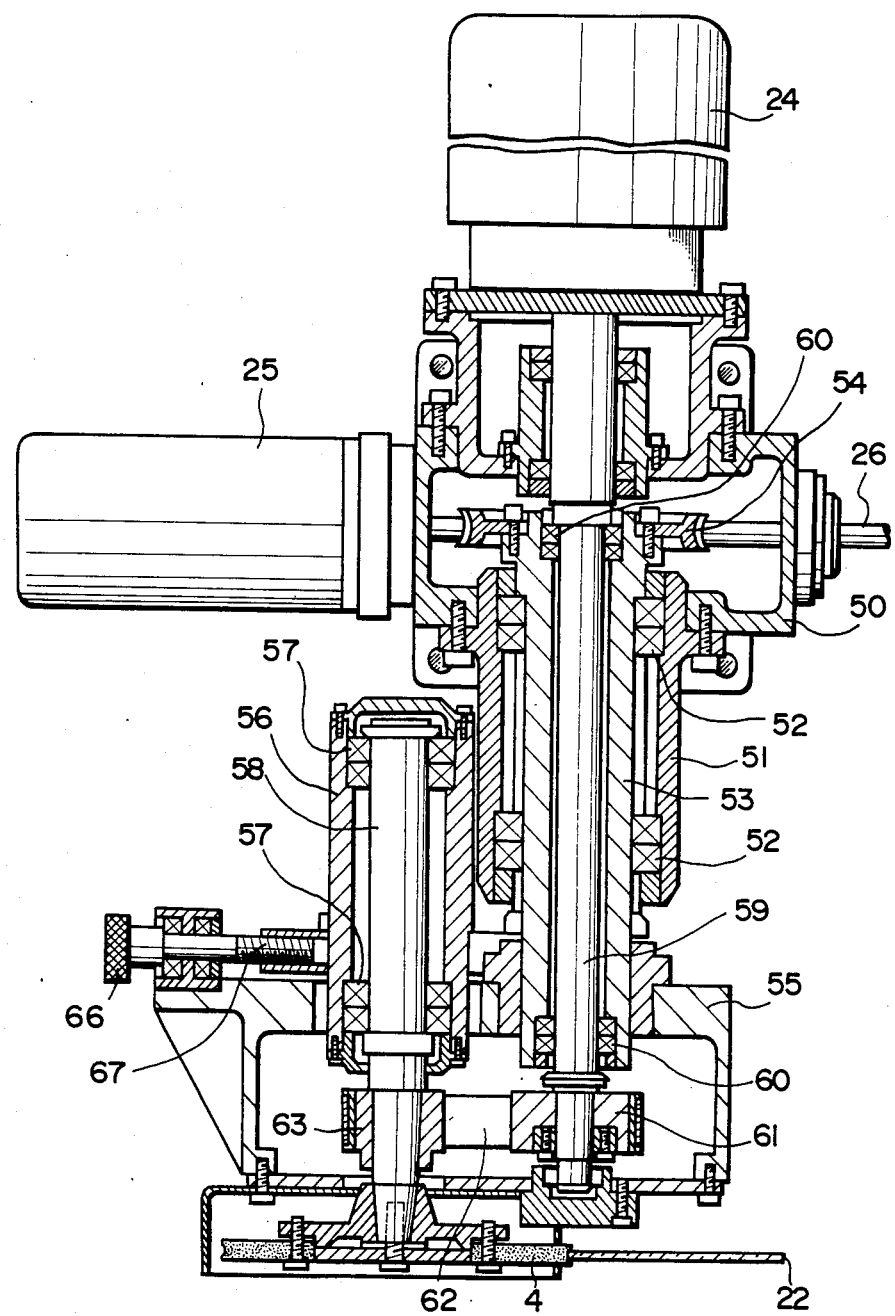
FIG. 12 is an enlarged longitudinal sectional view.

FIG. 11 is an enlarged side view of the grinding unit 2 viewed from the direction indicated by arrow V in FIG. 1, and FIG. 12 is an enlarged sectional front view thereof. A supporting frame 50 is fixed on a front end face of the carriage 6 of the grinding unit 2 and extends toward the front. A bearing outer cylinder 51 extending along the Z-axis (downward) is arranged on the lower portion of the supporting frame 50. A $\theta$ spindle 53 is pivotally supported by bearings 52 at upper and lower ends of the bearing outer cylinder 51. The $\theta$ shaft control motor 25 is mounted on the side surface of the supporting frame 50, and the $\theta$ spindle 53 is rotated through a worm (not shown) and a worm wheel 54 by the coupling shaft 26 coupled to a rotating shaft of the motor 25.

A pivotal frame 55 is mounted at the lower end of the $\theta$ spindle 53, and the grinding wheel 4 mounted on the pivotal frame 55 is rotated about the Z-axis ($\theta$-axis) upon pivotal movement of the $\theta$ spindle 53.

A bearing outer cylinder 56 extends upright parallel to the Z-axis at a position separated from the $\theta$ spindle 53 on the upper surface of the pivotal frame 55. A rotating shaft 58 is axially supported inside the bearing outer cylinder 56 through a bearing 57. The grinding wheel 4 is arranged at the distal end of the rotating shaft 58, and the axis of the rotating shaft 58 is shifted by half a radius of the grinding wheel 4 so that the peripheral end face (grinding surface) of the grinding wheel and the axial center of the $\theta$ spindle 53 substantially coincide with each other along the Z-axis. The $\theta$ spindle 53 has a hollow portion, and a drive shaft 59 extends inside the pivotal frame 55 along the axis of the hollow portion while being axially supported by a bearing 60. The drive shaft 59 has the upper end coupled to a motor 24 mounted on the upper portion of the supporting frame 50, and the lower end mounting a pulley 61 thereon. The pulley 61 is coupled to a pulley 63 at the lower end of the rotating shaft 58 through a belt 62. The grinding wheel 4 is rotated by the motor 24 at high speed.

As described above, the axis of the $\theta$ spindle 53 and the peripheral end face (grinding surface) of the grinding wheel 4 coincide with each other along the Z-axis, the $\theta$ spindle 53 is axially supported by the carriage 6 along the Z-axis, and the carriage 6 commonly uses the X- and Y-axes together with the carriage 5 of the cutting unit 1. Therefore, the cutting line 21 formed on the glass plate material 17 by the cutting unit 1 substantially coincides with the moving path (envelope) of the peripheral end face of the grinding wheel 4. The cutting and grinding units 1 and 2 commonly use the X- and Y-axes, and respective tools (the cutting and grinding wheels 3 and 4) can be position controlled by single software and NC data.

In practice, since a grinding margin is provided, the moving envelope of the grinding wheel 4 is formed slightly inside the cutting line 21. In order to finely adjust the grinding margin, a distance between the axis of the rotating shaft 58 of the grinding wheel 4 and the axis of the $\theta$ spindle 53 can be adjusted.

The bearing outer cylinder 56 of the rotating shaft 58 is fixed on a movable block 64, as shown in FIG. 11, and the movable block 64 is slidably guided through a slide bearing 65 on the pivotal frame 56 so as to be horizontally movable. An adjusting knob 66 is provided on one end portion of the pivotal frame 55, and a threaded portion 67 at the distal end side of the adjusting knob 66 is meshed with the movable block 64. Therefore, when the adjusting knob 66 is rotated, the movable block 64 can be moved in the horizontal direction, thereby shifting the position of the peripheral end face of the grinding wheel 4 from the axis of the $\theta$ spindle 53.

When the peripheral end face of the grinding wheel 4 is projected forward (viewed from the adjusting knob 66 side) from the axis of the $\theta$ spindle 53, the projected distance corresponds to the grinding margin. Under the $\theta$-axis control of the $\theta$ spindle 53, the pivotal frame 55 is angularly controlled so that the projecting direction of the grinding wheel 4 is always perpendicular to the edge line of the glass plate 22. Therefore, while the grinding wheel 4 encircles the glass plate 22 and the center of the grinding wheel 4 is rotated through 360° about the $\theta$ spindle 53, the edge grinding operation is performed such that the peripheral end face of the grinding wheel 4 forms a moving path slightly inside the cutting line 21 (coinciding with the moving path of the axis of the $\theta$ spindle) to the extent of the grinding margin. A water supply nozzle (not shown) is provided adjacent to the grinding unit so as to supply cooling water to the grinding unit while the grinding wheel 4 grinds the glass plate 22.

Figure 13:
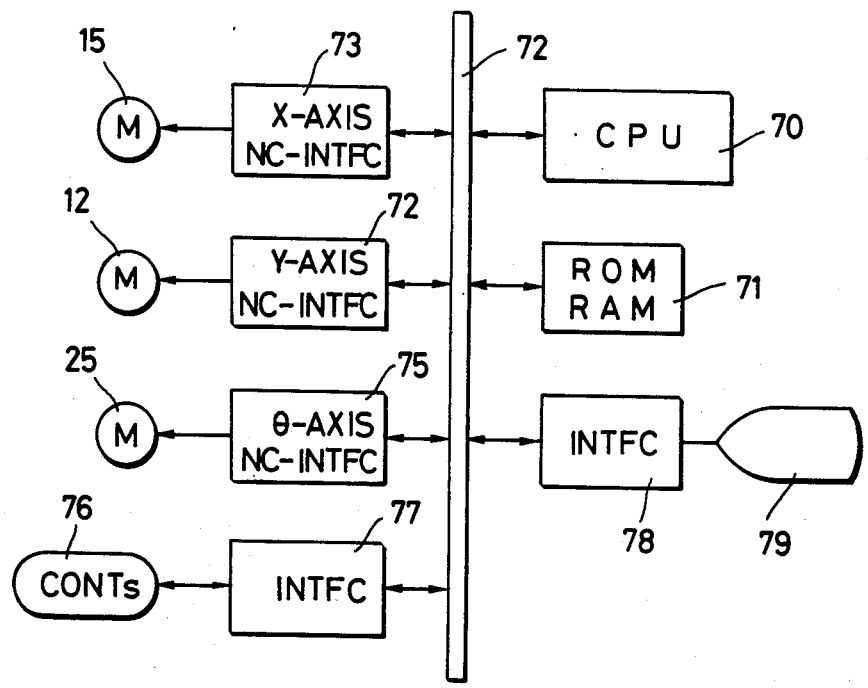
FIG. 13 is a block diagram of a control system.
Figure 15:
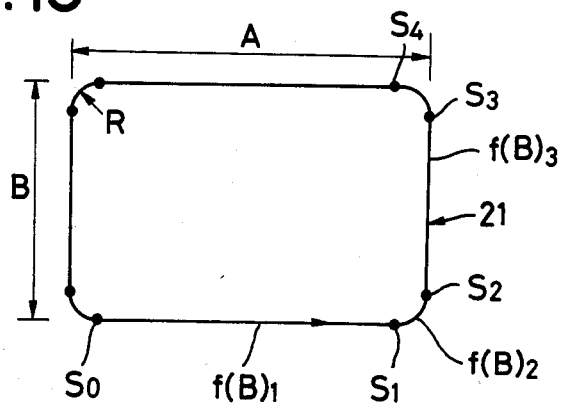
FIG. 15 is a view showing an example of a machining shape (pattern).
Figure 14A:
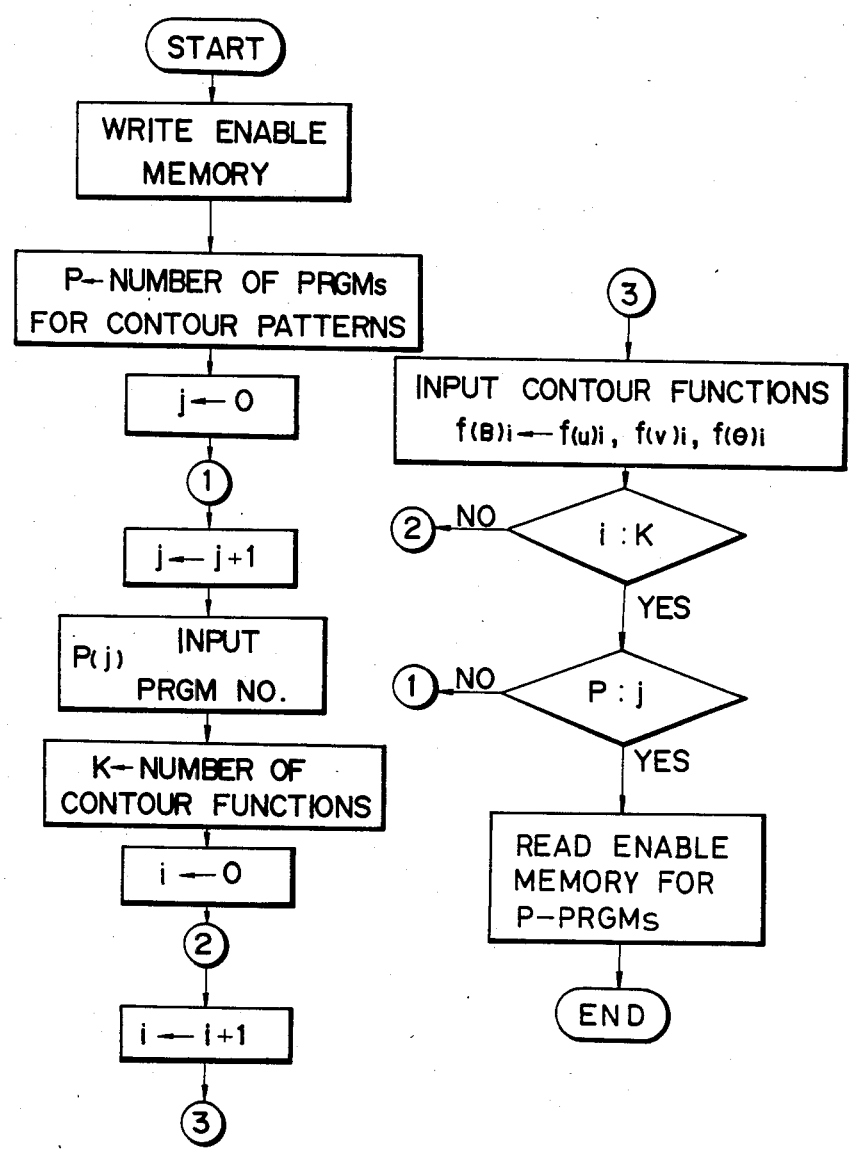
FIG. 14A is a flow chart showing an input procedure of NC data.
Figure 14B:
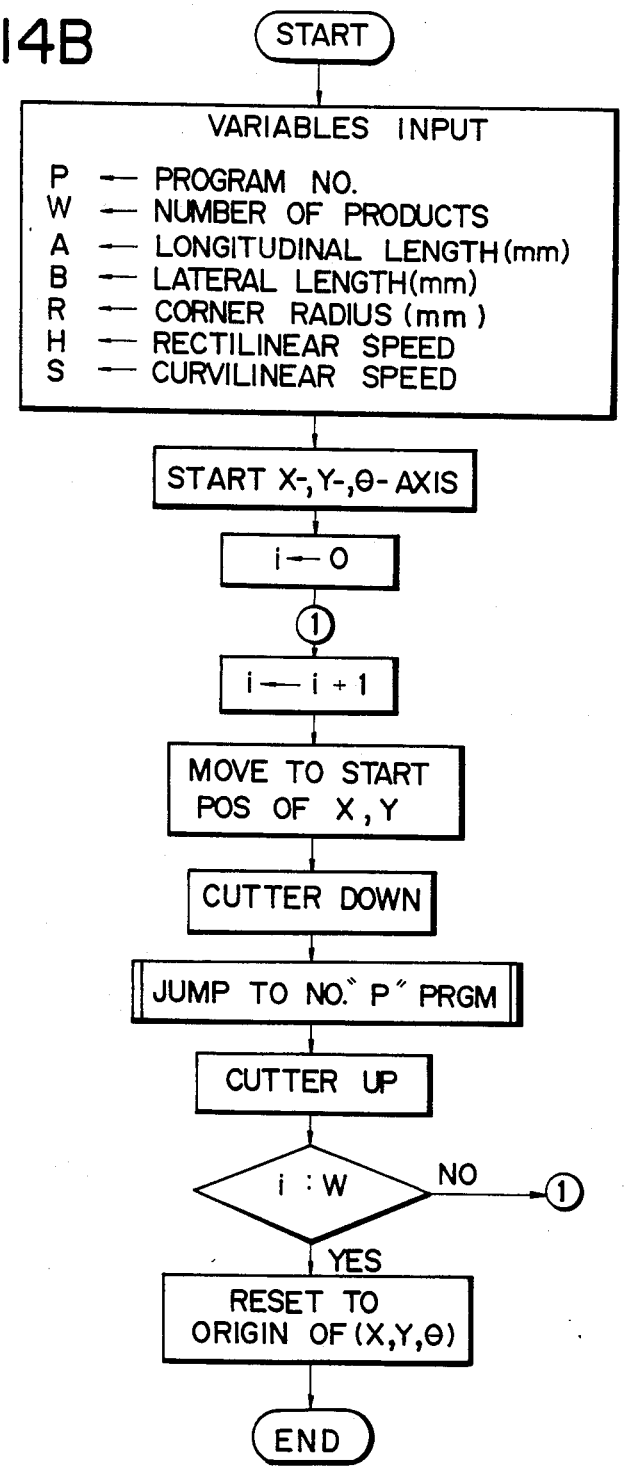
FIG. 14B is a flow chart showing an execution procedure of a machining program.

FIG. 13 is a block diagram of a control system of the glass plate cutting/grinding apparatus shown in FIGS. 1 to 12. FIG. 14A is a flow chart showing input steps of the NC data, FIG. 14B is a flow chart showing machining steps, and FIG. 15 is a representation showing an example of a machining pattern which is, in this case, a rectangle with R corners.

As shown in FIG. 13, the control system is constituted by a computer comprising a CPU 70 and a memory 71 (ROM and RAM). A control data output from the CPU 70 is supplied to X-, Y- and $\theta$-axis NC-INTFCs (numerical control interfaces) 73 to 75 through a bus 72, and the X-, Y- and $\theta$-axis control motors 15, 12 and 25 are controlled by the control outputs from the interfaces 73 to 75. A contour function, an interpolation formula, and constant data for determining the cutting line 21 are written in the memory 71 for each cutting pattern.

A group of limit switch contacts 76 arranged on respective mechanism portions is coupled to the CPU 70 through an interface 77, and the apparatus is initialized (reset) in accordance with the contact outputs. An operation state and the control data can be monitored by a CRT 79 coupled to an interface 78.

FIG. 14A is a flow chart of an initial setting program for storing NC control data in the memory 71. First, the memory 71 is set in a write enable state, and the number of programs P (patterns) corresponding to the contour patterns is written in the memory 71. Then, a j register which is incremented by each program is prepared, and the first to jth program P(j) (j=1, 2, ..., p) are sequentially registered.

In each program, a contour of the cutting pattern is divided into a plurality of blocks, and a contour pattern is functionally expressed as a group of variable equations corresponding to the respective blocks. Thus, the number of divided blocks (the number of contour functions) K is inputted for one pattern, and contour functions f(B)i corresponding to i blocks are inputted until an i register (initial value: 0) counts K. The contour functions for a pattern consist of a linear interpolation formulas f(u) or curve interpolation formulas f(v), and consist of tangential or normal direction control formulas $f(\theta)$ for the $\theta$-axis. The formulas $f(\theta)$ can be expressed as an inverse function $-(1/f'(u))$ or $-(1/f'(v))$ of derivatives of the linear or curve interpolation formulas f(u) or f(v) with respect to the X- or Y-axis.

In the example of the rectangular pattern with R corners shown in FIG. 15, the contour function number K is 8 which is equal to the number of sampling points $S_0, S_1, \ldots$ on the cutting line 21. In this case, contour functions of blocks defined by intervals between each two adjacent sampling points include linear interpolation formulas f(B)1, f(B)3, ..., and arc interpolation formulas 1(B)2, ....

When a setting operation of the jth program is completed, a (j+1)th program is set. When j=P, i.e., functions are set for all the types of patterns, the memory 71 is set in a read enable state for preset P programs.

FIG. 14B is a flow chart of machining steps in the case of the rectangular pattern with R corners. First, a cutting pattern program number P, a number of products W, a longitudinal length A, a lateral length B, a corner portion radius R, a rectilinear speed H, and a curvilinear speed S are inputted. The rectilinear speed is set to be high, and the curvilinear speed is set to be low. Then, X-, Y- and $\theta$-axes start instructions are generated, and cutting and grinding operations are continued until a variable i (initial value: 0) reaches the products number W.

In each machining process, the X- and Y-axes components are reset to start positions, and a down instruction of the cutting wheel 3 is then generated. The flow jumps to the Pth program and the Pth program is executed. In respective steps of each program, coordinate data of the sampling points of two ends of each block constituting the machining pattern, interpolation formula, the $\theta$-axis control formula and the machining speed data are read out, and are supplied to the X-, Y- and $\theta$-axis interfaces 73 to 75 as NC data. The respective interfaces generate drive pulse strings for driving the X-, Y- and $\theta$-axis control motors 15, 12 and 25 in accordance with the input NC data, thereby controlling the X-, Y- and $\theta$-axes.

When one program ends, the cutting wheel 3 is lifted, the machining number register i is incremented by one, and the next glass plate material 17 is conveyed, thus starting the cutting operation. The glass plate cut by the cutting unit 1 is conveyed to the grinding unit 2, and is subjected to the grinding operation simultaneously as the current cutting operation. As described above, since the operation of the grinding unit 2 is completely interlocked with that of the cutting unit 1, software for the grinding unit need not be prepared. When the cutting and grinding operations of the products number W end, the components of the respective axes are reset to original positions, thus ending the operation.

In the above embodiment, interpolation functions are stored as built-in software, and are read out as the NC data during the operation. However, control data can be supplied by using an NC tape. As an alternative to the interpolation function, a teaching method in which a cutting line along a plurality of sampling points on a contour of a template is instructed can be adopted. In the teaching method, in order to measure X-, Y- and $\theta$-axis deviations with respect to a template, a pulse generator, a counter and the like provided to a driving system are required. In addition, since errors in copying the template are produced, the machining precision thereof is slightly inferior to that of the interpolation function method. However, cutting and grinding operations for an arbitrary curve which cannot be functionally expressed can be performed.

In the above embodiment, cutting and grinding tools are position controlled along the X- and Y-axes. However, a work table can be moved upon fixing the tools. In the same manner as in the above embodiment, the tools are configurated to be angularly controlled about the Z-axis. In this embodiment, the cutting and grinding units 1 and 2 are provided in the same plane, but can be vertically aligned.

In the above embodiment, the cutting wheel 3 is used in the cutting unit 1. Instead, a conical cutter having a diamond head can be used. In this case, the $\theta$-axis control in the cutting unit 1 is not particularly required. However, when the apparatus is arranged so that a cutting path (cutting line) can be shifted inside or outside a preset contour, a $\theta$-axis control means is required in order to continuously deviate the cutter inside or outside the contour while the cutter traces the contour.

According to the present invention, since cutting and grinding operations are performed in parallel by a common contour tracing means, machining steps can be significantly decreased as compared to the prior art apparatus which separately performs cutting and grinding operations by different devices. In addition, the apparatus can be simplified and made compact in size. Tracing performance of the cutting and grinding units are the same, and therefore precise contour shaping can be performed. Since a contour tracing operation is performed by single control data, extra operations and adjustments for change in type (shape or size) of products are decreased, and quick response to change in type can be made. Therefore, when small quantities of a number of types of products are manufactured, the manufacturing efficiency can be greatly improved.

Furthermore, since the apparatus comprises an angle control means for the cutting or grinding tool, the tool can always be positioned inside the normal direction of the contour while tracing the contour, a proper grinding margin can be obtained. Even if a pattern enclosed by a grinding line is smaller by a grinding margin than a pattern enclosed by a cutting line, a tool position inside the direction normal to the cutting line can be continuously maintained by angle adjustment of the tool. Therefore, a common contour tracing means can be used for the cutting and grinding operations.

What is claimed is:

1. A contour shaping apparatus for cutting and grinding plate material comprising a first cutting work position and a second grinding work position; means for maintaining plate material in predetermined fixed orientations in the first and the second work positions during respective cutting and grinding thereof; the plate material being positioned, in turn, in the first and second work positions; the plate material fixed orientations being defined along orthogonal X and Y axes; means for cutting plate material in the first work position, the cutting means being movable along the X and Y axes over the plate material; control means operatively connected to the cutting means for guiding the cutting means along a predetermined contour on the plate material thereby effecting cutting of the plate material along the predetermined contour; means for grinding the edges of plate material in the second work position, the grinding means defining a first trace axis perpendicular to the X and Y axes; means for moving the grinding means along the X and Y axes in concidence with the cutting means whereby the grinding means trace axis traces the perimeter edge of a previously cut plate material in the grinding work position while the cutting means cuts plate material in the cutting position along the same predetermined contour; the grinding means includes a grinding head and means for spinning the grinding head about a grinding head axis, the grinding head axis being aligned generally perpendicularly to the X and Y axes and spaced from the grinding means trace axis an amount corresponding the radius of the grinding head at the point of grinding head contact with the plate material; means for rotating the grinding means about the trace axis; the rotating means operatively interconnected to the control means whereby a line passing through the center of the grinding head and the trace axis is maintained normal to the plate material edge while the trace axis is moved therealong.

2. A contour shaping apparatus according to claim 1, wherein said control means comprises:
   a memory for strong machining programs including contour functions formulated in the X-Y coordinate system, angle controlling functions formulated with a variable trace axis angle with respect to a normal to the contour, and constant factors;
   a CPU for delivering numerical control data in accordance with read out data from the memory; and
   numerical control interfaces for delivering control signals to actuators of the X-, Y- and trace axes in accordance with said numerical control data.

3. A contour shaping apparatus according to claim 2, wherein said contour functions consists of linear interpolation formulas and curve interpolation formulas corresponding with every segments along the contour, said segments being defined by intervals between every two adjacent sampling points pointed on the contour at every curvature variations.

4. A contour shaping apparatus according to claim 1 wherein the means for moving the cutting means and the grinding means respectively comprise carriages movable along the X-axis by a common X-axis component at a fixed interval therebetween, said cutting and grinding means are attached to the respective carriages and said common X-axis component is provided on a moving table which is moved along a single Y-axis by a Y-axis component.

5. A contour shaping apparatus according to claim 4, wherein said X-axis component comprises a common feed screw engaged with said carriages and a X-axis control motor, and said Y-axis component comprises a feed screw engaged with said moving table and a Y-axis control motor.

6. A contour shaping apparatus according to claim 2, wherein said angle controlling functions are derivatives of said contour functions or inverse functions of the derivatives.

7. A contour shaping apparatus according to claim 2, wherein said constant factors includes size data of the contour to be shaped and machining speed data at linear portions and curve portions thereof.

8. The contour shaping apparatus according to claim 7 wherein the cutting means defines a cutting axis whereby plate material is cut when the cutting means is moved thereon in the direction of the cutting axis; means for rotating the cutting means about a second trace axis substantially perpendicular to the X and Y axes; the rotating means operatively interconnected to the control means whereby the cutting axis is maintained tangent the predetermined contour during the cutting thereof.

9. A contour shaping apparatus according to claim 8, wherein said grinding means comprises a grinding wheel and said grinding means is rotated about the trace axis such that a line passing through the center of said grinding wheel is normal to the edge surface at the point of contact.

10. A contour shaping apparatus according to claim 8, wherein said means for rotating the cutting and grinding means comprise a single component commonly used in said cutting and grinding means and said single component being mounted on a X-axis component commonly used in said cutting and grinding means and has means coupling said trace axes with each other at a fixed internal between said cutting and grinding units.

11. A contour shaping apparatus according to claim 10, wherein said trace axes component comprises a trace axes control motor having a drive shaft extending parallely with the X-axis, a pair of worms fixed on a coupling shaft extending from said drive shaft, at said fixed interval between the cutting and grinding means, and a pair of worm wheels respectively engaged with said worms to transmit the trace rotation to respective trace axes of the cutting and grinding means.

12. A contour shaping apparatus according to claim 1, wherein said cutting means comprises pressure means for giving a cutting pressure to cutting tool along the direction of trace axis.

13. A contour shaping apparatus according to claim 1, said trace axis of the cutting means comprises a bridge member attached to a distal end thereof through a cranked arm so as to extend perpendicular to the trace axis with crossing the center thereof and said cutting means is mounted slidably on said bridge member through a sliding member, along the extending direction of said bridge member so as to be shifted perpendicular to a Z-axis away from a reference point of the trace axis.

14. A contour shaping apparatus according to claim 13, wherein said cutting means is attached to a distal end of a piston rod extending along trace axis through a hold formed in said bridge member, and said piston rod is movable along Z-axis by a pressure cylinder provided on said sliding member.

15. A contour shaping apparatus according to claim 13, wherein said bridge member comprises an adjusting knob having a threaded portion extending along the longitudinal direction of said bridge member to mesh with said sliding member so that the position of the cutting means is adjusted outward/inward a reference contour to be shaped by turning said adjusting knob to project/withdraw said sliding member along the extending direction of said bridge member.

16. A contour shaping apparatus according to claim 15, wherein said cutting means is a wheel cutter, the cutting edge of the wheel cutter is directed perpendicular to the movable direction of said sliding member and said trace axis control is performed to direct the cutting edge in a tangential direction of an inner/outer line along the contour.

17. A contour shaping apparatus according to claim 1, wherein said grinding means comprises a grinding wheel provided to a distal end of a rotating shaft extending in parallel with the trace axis of the grinding means so as to rotate on the same plane as the cut plate material, said drive shaft being displaced by half a radius of said grinding wheel so that the peripheral end surface of the grinding wheel coincides with the trace axis.

18. A contour shaping apparatus according to claim 17, wherein said grinding means comprises a drive motor for rotating the grinding wheel, a drive shaft of said drive motor extends coaxially with the trace axis of the grinding means and is coupled with said rotating shaft through a belt extending between respective pulleys provided on the rotational shaft and the drive shaft.

19. A contour shaping apparatus according to claim 18, wherein said trace axis comprising a pivotal frame fixed at the distal end thereof, said rotating shaft is supported in parallel with the trace axis at a pivotal end of said pivotal frame so as to be pivoted around said trace axis and said trace axis control is performed such that a line passing through both centers of the rotating shaft and the trace axis is kept normal to the contour to be shaped while the trace axis traces the contour.

20. A contour shaping apparatus according to claim 19, wherein said pivotal frame comprises a movable member slidably guided on said pivotal frame to carry said rotating shaft in parallel with the trace axis and an adjusting knob having a threaded portion extending along the line passing through both centers of the rotating shaft and the trace axis to mesh with said movable member, the position of the grinding wheel being adjusted by turning said adjusting knob so that the peripheral end surface of the grinding wheel is shifted inside the edge line of the cut plate to an extent corresponding to a grinding margin.

21. A contour shaping apparatus according to claim 1, further comprising a conveying means for conveying the cut plate material from the cutting means to the grinding means, said conveying means comprising:
holding means for holding up the cut plate material from the cutting means;
track means for transporting said holding means along a standing line of said cutting and grinding means; and
positioning means including a pair of stoppers projecting along said track means at both ends thereof, a reference side holding means being knocked against said stoppers for positioning said holding means at respective reference positions of the cutting means and grinding means.

22. A contour shaping apparatus according to claim 21, wherein said holding means comprises a pivotal arm device having suction pad means at a distal end thereof to stick the cut plate material and a pivot drive source for pivotally lifting up and down said pivotal arm device between an upper position for conveying the cut plate and respective reference planes of said cutting and grinding means.

23. A contour shaping apparatus according to claim 21, wherein said track means comprises:
a carriage for carrying said holding means in the transporting direction;
long guide means for guiding said carriage along the transporting direction;
short guide means for guiding said holding means mounted on said carriage in parallel with said long guide means;
linear drive means for driving said carriage along said long guide means and for positioning said carriage roughly in front of the cutting and grinding means; and
urging means for urging said holding means along said short guide means until the reference side of the holding means is knocked against one of said stoppers provided at both ends of said long guide means in order for the holding means to be finely positioned at respective reference positions of the cutting and grinding means.

24. A contour shaping apparatus according to claim 23, wherein said linear drive means comprises a rack extending along said long guide means, a pinion meshed with said rack, and a drive motor provided on said carriage to drive said pinion.

25. A contour shaping apparatus according to claim 23, wherein said urging means comprises an unit of power cylinder and a piston rod, one of which is fixed on said holding means while another one is fixed on said carriage so as to urge said holding means in the direction of said short guide means by extension/withdrawal of said piston rod.

* * * * *